(No Model.)

F. DE FONTES.
SAFETY CAR FENDER.

No. 515,198. Patented Feb. 20, 1894.

WITNESSES:-
L. Ismy Van Horn.
Charles B. Mann Jr.

INVENTOR:-
F. De Fontes
By Chas B. Mann
ATTORNEY.

UNITED STATES PATENT OFFICE.

FRANCIS DE FONTES, OF BALTIMORE, MARYLAND.

SAFETY CAR-FENDER.

SPECIFICATION forming part of Letters Patent No. 515,198, dated February 20, 1894.

Application filed October 24, 1893. Serial No. 489,019. (No model.)

*To all whom it may concern:*

Be it known that I, FRANCIS DE FONTES, a citizen of the United States, residing at Baltimore, in the State of Maryland, have invented certain new and useful Improvements in Safety Car-Fenders, of which the following is a specification.

This invention relates to a safety fender device for street cars.

The object is to provide a special roller device for attachment to cars which will prevent a person, who may be run down by the car, from getting under the wheels.

The invention is illustrated in the accompanying drawings, in which—

Figure 1:
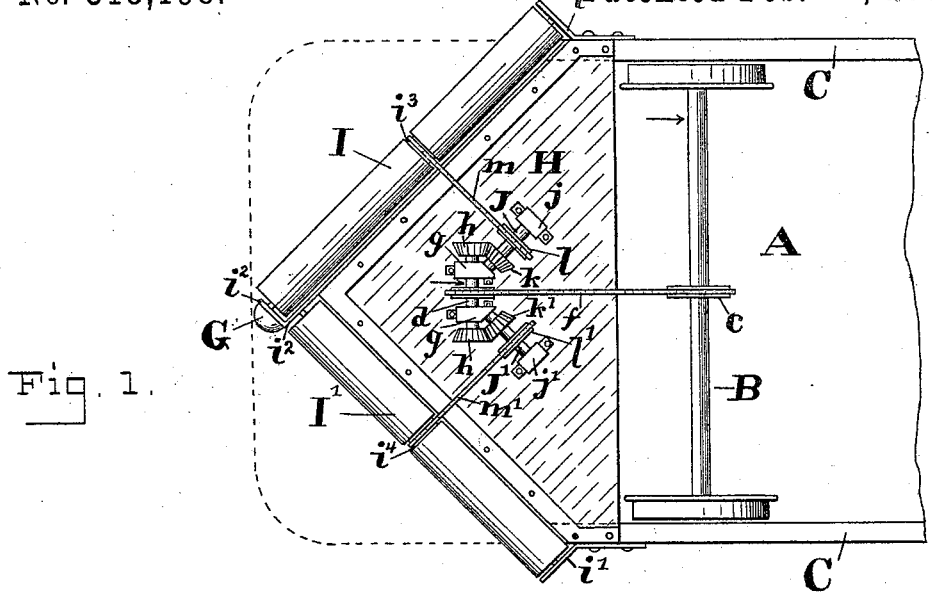
Figure 2:
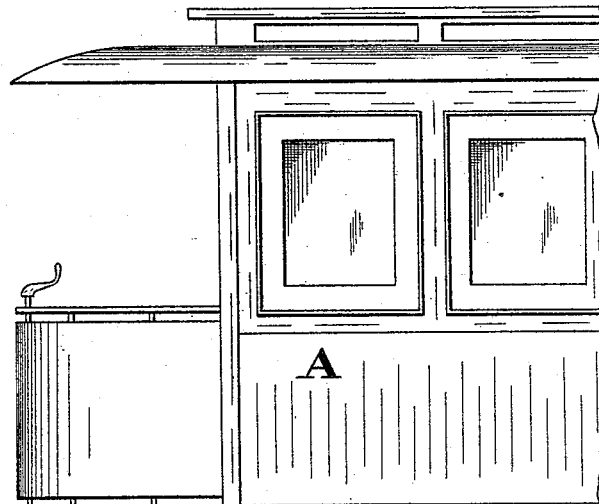

Figure 1 is an inverted plan view of the fender attached to a car. Fig. 2 is a side elevation of a car provided with my improved fender.

The car-body, A, has, as usual, an axle, B; for the purposes of my invention this axle has a sprocket-wheel, $c$; a horizontal platform, H, is secured to the front end of the car, being attached to the under side of the frame of the car-truck, C; this platform is of triangular form and its purpose is to hold a person who may be run down by the car, the person being deposited thereon in a manner hereinafter described. A shaft, $d$, parallel with the axle is journaled in bearings, $g$, on the under side of the platform and carries two miter gear wheels, $h$, one at each end; a drive-chain, $f$, communicates motion from the sprocket-wheel on the axle to the sprocket-wheel on the shaft. Two rollers, I, I', covered with rubber or other flexible elastic sheathing have diagonal position with respect to the front end of the car, one being in front of each diagonal side of the platform, and are journaled at their ends nearest the car in angularly bent bearings, $i, i'$, attached to the car-truck frame, and their other ends are journaled in bearings, $i^2$, at the apex or front of the horizontal platform, H; these rollers are provided with sprocket-wheels, $i^3, i^4$, and have position at right angles with respect to each other, so that they project forward in V-form; a cushion, G, of rubber or other elastic material is near the intersection of the ends of the rollers, being supported by the bearing, $i^2$, at the end of the roller, I, and acts to prevent injury by lessening the shock or concussion received by a person struck by the fender.

Two short shafts, J, J', are each journaled at one end in the bearings, $g$, and their other ends in bearings, $j, j^2$, on the under side of the platform, H; these shafts have position parallel with the rollers and diagonally with respect to the shaft, $d$, and each has a miter gear wheel, $k, k'$, gearing with the miter wheels, $h$, on the shaft, $d$, and each also has a sprocket wheel, $l, l'$, and a drive-chain, $m, m'$, communicates motion therefrom to the sprocket-wheels, $i^3, i^4$, of the rollers, I, I', whereby said rollers are revolved.

It will be observed that the construction and arrangement of the several parts of the fender are such that the rollers, I, I', revolve in a direction opposite from the car-axle, B, so that when a person is run down by the car he will be rolled, brushed up or raised by the rollers onto the platform, H, where he will be held until the car is stopped. This will be fully understood from the following: When the car is in motion, the car-axle, B, revolves forwardly or in the direction indicated by the arrow in Fig. 1; the shaft, $d$, which receives motion from the car-axle by means of the drive-chain, $f$, revolves in the opposite direction (also indicated by arrow in Fig. 1); the shaft, $d$, actuating the short shafts, J, J', causes the latter to revolve forward or in reverse direction to it, and finally the drive-chains, $m$, $m'$, connecting each of said short shafts with the rollers, I, I', respectively, revolve the latter as hereinbefore described.

It will be understood that each end of the car may be provided with a fender device like that described; and it is also to be understood that the construction of the several parts of the fender may be varied somewhat without departing from my invention.

In winter weather the plain rollers, I, I', may be removed and sweep rollers or revolving brushes inserted in their place and thereby the tracks may be kept clear of snow.

As the fender is attached to the rigid frame of the car-truck, it is not affected in respect to maintaining a predetermined position above the street surface by the compression of the springs between said frame and car-body caused by the movement of the latter, which would be the case if it were attached to the car itself.

Having thus described my invention, what I claim as new, and desire to secure by Letters Patent, is—

The combination of a triangular platform secured to the car-truck frame; a car-axle having a sprocket-wheel; a transverse shaft, $d$, on the under side of the platform and parallel with the axle and provided with a sprocket-wheel and two miter gear-wheels; two short shafts each having a gear-wheel meshing with the gear-wheels of the transverse shaft, $d$, and each provided with sprocket-wheels; two safety rollers in front of the platform and parallel with the angular sides thereof and the two together forming a V; a cushion, G, adjacent to the intersection of the V-point of the said two rollers; and drive-chains between the short shafts and said rollers for actuating the latter.

In testimony whereof I affix my signature in the presence of two witnesses.

FRANCIS DE FONTES.

Witnesses:
 EGIDIO MULINAU,
 CHAS. B. MANN.